(12) United States Patent
Silver et al.

(10) Patent No.: US 9,395,192 B1
(45) Date of Patent: Jul. 19, 2016

(54) METHODS AND SYSTEMS FOR ROAD AND LANE BOUNDARY TRACING

(71) Applicant: Google Inc., Mountain View, CA (US)

(72) Inventors: David Harrison Silver, Mountain View, CA (US); David Ian Ferguson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 14/135,935

(22) Filed: Dec. 20, 2013

(51) Int. Cl.
*G01C 21/26* (2006.01)

(52) U.S. Cl.
CPC ..................................... *G01C 21/26* (2013.01)

(58) Field of Classification Search
CPC ...... G01C 21/20; G01C 21/26; G06K 9/4604; G09B 29/106
IPC ........ G01C 21/20; G06K 9/4604; G09B 29/106
See application file for complete search history.

(56) References Cited

U.S. PATENT DOCUMENTS

| | | | |
|---|---|---|---|
| 7,881,497 B2 | 2/2011 | Ganguli et al. | |
| 7,983,446 B2 * | 7/2011 | Wiedemann et al. | 382/103 |
| 8,060,271 B2 | 11/2011 | Dolgov et al. | |
| 8,195,386 B2 * | 6/2012 | Hu et al. | 701/436 |
| 8,311,274 B2 * | 11/2012 | Bergmann et al. | 382/103 |
| 8,750,567 B2 * | 6/2014 | Zhang et al. | 382/103 |
| 2013/0266175 A1 | 10/2013 | Zhang et al. | |

* cited by examiner

*Primary Examiner* — Jerrah Edwards
*Assistant Examiner* — Aaron Smith
(74) *Attorney, Agent, or Firm* — McDonnell Boehnen Hulbert & Berghoff LLP

(57) ABSTRACT

Methods and systems for road boundary and lane tracing are described herein. In an example implementation, a computing system of a vehicle may receive boundary data associated with a road and may determine edge data representative of edges of the boundaries. A given edge may indicate a discontinuity between a boundary and a characteristic of the road. The computing system may modify the edge data based on a position and orientation of respective edges to combine edges positioned substantially in parallel and within a threshold distance to each other. The computing system may adjust boundary data based on the modified edge data so as to extend a given boundary that includes a combined edge and may determine whether extended boundary data substantially matches road data indicated by a map. In addition, the computing system may provide an estimation of projections of boundaries ahead of the vehicle on the road.

20 Claims, 6 Drawing Sheets

METHODS AND SYSTEMS FOR ROAD AND LANE BOUNDARY TRACING

BACKGROUND

Unless otherwise indicated herein, the materials described in this section are not prior art to the claims in this application and are not admitted to be prior art by inclusion in this section.

A driver may navigate a vehicle along various paths, which may often include driving the vehicle on a road. A road may often include a variety of markers or boundaries positioned to assist drivers navigate safely. For example, a road may include road curbs, guard rails, or lane markers. A road curb may help indicate where the border of the road exists. Similarly, a road may include guardrails to prohibit vehicles from crossing into another road or lane markers to indicate the spacing of lanes. During navigation, a driver may use road curbs or the other types of boundaries to assist with navigating her vehicle.

SUMMARY

The present application discloses embodiments that relate to methods and systems for road boundary and lane tracing.

In one example, the present application describes a method. The method may comprise receiving, at a computing device, boundary data that is based on detection of a plurality of boundaries associated with a road of travel of a vehicle. The method may further include, based on the boundary data, determining edge data representative of a plurality of edges of the plurality of boundaries and a given edge indicates a discontinuity between a given boundary and a characteristic of the road of travel. The method may also include modifying the edge data based on a position and orientation of respective edges of the plurality of edges so as to combine edges positioned substantially in parallel and within a threshold distance to each other and adjusting the boundary data based on the modified edge data so as to extend a given boundary that includes a combined edge. The method may further include determining whether extended boundary data in the adjusted boundary data substantially matches road data indicated by a map of the road of travel, and based on the adjusted boundary data substantially matching the road data indicated by the map of the road of travel, providing an estimation of one or more projections of respective boundaries of the plurality of boundaries ahead of the vehicle on the road.

In another example, the present application describes a non-transitory computer readable medium having stored thereon executable instructions that, upon execution by a computing device, cause the computing device to perform functions. The functions may comprise receiving, at a computing device, boundary data that is based on detection of a plurality of boundaries associated with a road of travel of a vehicle. The functions may further include, based on the boundary data, determining edge data representative of a plurality of edges of the plurality of boundaries and a given edge indicates a discontinuity between a given boundary and a characteristic of the road of travel. The functions may also include modifying the edge data based on a position and orientation of respective edges of the plurality of edges so as to combine edges positioned substantially in parallel and within a threshold distance to each other and adjusting the boundary data based on the modified edge data so as to extend a given boundary that includes a combined edge. The functions may further include determining whether extended boundary data in the adjusted boundary data substantially matches road data indicated by a map of the road of travel, and based on the adjusted boundary data substantially matching the road data indicated by the map of the road of travel, providing an estimation of one or more projections of respective boundaries of the plurality of boundaries ahead of the vehicle on the road.

In still another example, the present application describes a system. The system may comprise at least one processor. The system may also comprise a memory having stored thereon executable instructions that, upon execution by the at least one processor, cause the system to perform functions comprising receiving, at a computing device, boundary data that is based on detection of a plurality of boundaries associated with a road of travel of a vehicle. The functions may further include, based on the boundary data, determining edge data representative of a plurality of edges of the plurality of boundaries and a given edge indicates a discontinuity between a given boundary and a characteristic of the road of travel. The functions may also include modifying the edge data based on a position and orientation of respective edges of the plurality of edges so as to combine edges positioned substantially in parallel and within a threshold distance to each other and adjusting the boundary data based on the modified edge data so as to extend a given boundary that includes a combined edge. The functions may further include determining whether extended boundary data in the adjusted boundary data substantially matches road data indicated by a map of the road of travel, and based on the adjusted boundary data substantially matching the road data indicated by the map of the road of travel, providing an estimation of one or more projections of respective boundaries of the plurality of boundaries ahead of the vehicle on the road.

In another example, a system is provided that comprises a means for receiving, at a computing device, boundary data that is based on detection of a plurality of boundaries associated with a road of travel of a vehicle. The system may also comprise a means for, based on the boundary data, determining edge data representative of a plurality of edges of the plurality of boundaries and a given edge indicates a discontinuity between a given boundary and a characteristic of the road of travel. The system may further include a means for modifying the edge data based on a position and orientation of respective edges of the plurality of edges so as to combine edges positioned substantially in parallel and within a threshold distance to each other and adjusting the boundary data based on the modified edge data so as to extend a given boundary that includes a combined edge. The system may also include a means for determining whether extended boundary data in the adjusted boundary data substantially matches road data indicated by a map of the road of travel, and based on the adjusted boundary data substantially matching the road data indicated by the map of the road of travel, providing an estimation of one or more projections of respective boundaries of the plurality of boundaries ahead of the vehicle on the road.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
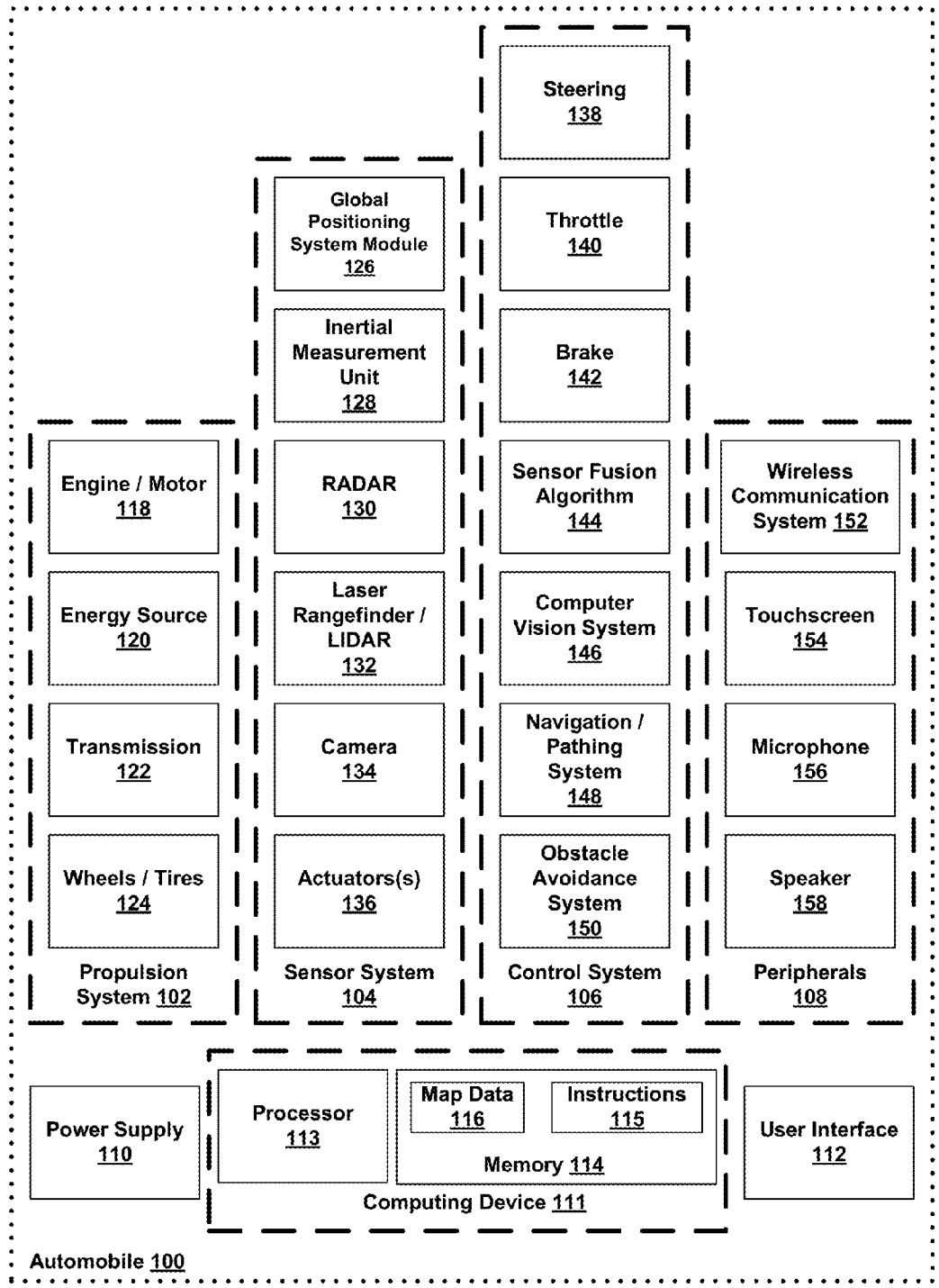
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A vehicle, such as an autonomous or driverless vehicle, may navigate a path of travel without requiring a driver to provide guidance and control. To accomplish autonomous navigation, a vehicle may utilize data about the local environment surrounding the vehicle acquired from sensors associated with the vehicle and may also use information provided by other sources (e.g., a map). Upon receiving data corresponding to the local environment, a computing system of the vehicle may process the data to determine and execute control strategies (e.g., safe paths of travel) for the vehicle. The control strategies may involve navigating around obstacles, properly adhering to traffic signs, determining a proper speed and direction as well as preventing collisions with other vehicles, for example.

In some instances of object detection, the vehicle's computing system may use data provided by sensors and/or other sources to detect and locate nearby boundaries associated with the road that the vehicle is navigating. For example, the computing system may detect lane markers, road curbs, guard rails, or other types of boundaries in the local environment of the vehicle. Detecting various boundaries may be useful for determining control strategies for the vehicle. The computing system may use the detected boundaries to maintain lane positioning for the vehicle or to assist in other aspects of navigation. For example, the computing system of the vehicle may use or follow a road curb to detect when to execute a turn or to find a different road. Other uses of the boundary data of the vehicle's local environment may exist as well.

Upon detecting the various possible boundaries within the vehicle's local environment, a computing system of the vehicle may be configured to analyze the data representing the boundaries. The computing system may analyze the data to determine the accuracy of the data, such as whether the position and orientation of boundaries may be correctly represented within the boundary data. Similarly, the computing device may check the boundary data prior to determining control strategies for the vehicle.

In some instances, a vehicle may be equipped with a classifier or computing system configured to extract edge data from the data representing the local environment. The edge data may represent the edges of the detected boundaries and may enable the computing system to further process the data prior to executing navigational functions based on the received data. In an example implementation, the computing system may detect or trace edges of boundaries using Canny edge detection.

After extracting edge data, the computing system may process the edge data to filter or adjust data within the edge data. For example, the computing system may determine that multiple edges may be positioned substantially in parallel within a threshold distance of each other as represented in the edge data. In response, the computing system may modify the edge data to represent either one of the multiple edges or combine the edges. In such an example, the computing system may reduce edges caused by noise by combining the edges into a single edge within the edge data. Similarly, the computing system may modify edge data to fill in edges within small gaps in structure that may have resulted from noise or other system defects, for example. In some instances, gaps may occur due to occlusions, which may result from interference by other vehicles. The computing system may also connect, remove, add, or break up edges within the edge data, for example.

In response to modifying the edge data, the computing system may adjust the boundary data to match the modifications of the edge data. In particular, the computing system may cause the boundaries within the boundary data to match the edges as represented within the edge data, which may involve extending, removing, modifying, or performing other functions to the boundaries in the boundary data. Furthermore, the computing system may also filter the boundary data, which may involve checking the boundaries as represented by the boundary data for smoothness to detect any irregularities. For example, the computing system may break boundaries that may not be sufficiently smooth into multiple boundaries, remove sections, or eliminate them completely.

In addition, the computing system may use the boundary data to estimate projections of the boundaries ahead of the vehicle on the road of travel, for example. The computing system may estimate projections of boundaries that extend outside the zone of data that sensors are able to access at the location of the vehicle. Road curbs may often border a road for long distances and this may factor in the computing system's ability to estimate projections of boundaries that the vehicle may likely approach as the vehicle continues to navigate. The estimations of projected boundaries may enable a computing system of the vehicle to determine longer-term control strategies for the vehicle, which may take into account the estimated projections. For example, the computing system of a vehicle may estimate projections of boundaries or other data meters or more ahead of the vehicle on the road. The estimated projections of boundaries ahead of the vehicle may be used by the computing system for other functions or purposes as well.

In another example implementation, the computing system may determine whether extended boundary data in the adjusted boundary data substantially matches road data indicated by a map of the road of travel. The computing system may use data provided by a map or multiple maps to determine if the boundary data is accurate, for example. In addition to analyzing the boundary data with information provided by a map, the computing system of a vehicle may use data provided from other sensors to check the boundary data for accuracy. For example, the computing system may use camera images to determine whether or not a boundary (e.g., guard rail) includes gaps or if the gaps present in the boundary data may have resulted from data acquisition noise or obstacle obstruction. The computing system may use the map data and/or other types of data to assist with processing the boundary data to match the position and orientation of boundaries in the environment relative to the vehicle.

In addition, the computing system may further provide an estimation of projections of respective boundaries of local boundaries ahead of the vehicle on the road based on the adjusted boundary data substantially matching the road data indicated by the map of the road of travel, for example. The computing system may use the boundary data to estimate projections of road curbs, lane markers, or other boundaries ahead of the vehicle on the road. For example, the computing system may estimate that lane markers may extend in a straight path for a distance ahead of the vehicle on the road based on data acquired by sensors (e.g., LIDAR) about lane markers positioned near the vehicle. The computing system may use the map data or other data to assist with estimating projections of local boundaries of the road.

Furthermore, the computing system may also analyze boundary data and/or estimated projections of boundaries based on map data or characteristics shown by the boundaries according to the boundary data. For example, the computing system may analyze whether the boundary data indicates that a road curb extends in a smooth, connected manner, which may likely indicate the boundary data may be correct. Similarly, the computing system may determine that boundary data indicating that a road curb changes orientation quickly and often with some gaps may require the computing system to further process the boundary data to ensure accurate and efficient results. In such a case, the computing system may determine that the boundary data represents multiple segments of road curbs rather than a single road curb or that the boundary data representing the particular road curb may be the result of data-acquisition noise or other errors. Within other example implementations, a computing system or other entity may execute other processes for road and lane boundary tracing.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be traveling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well.

The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, follow objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
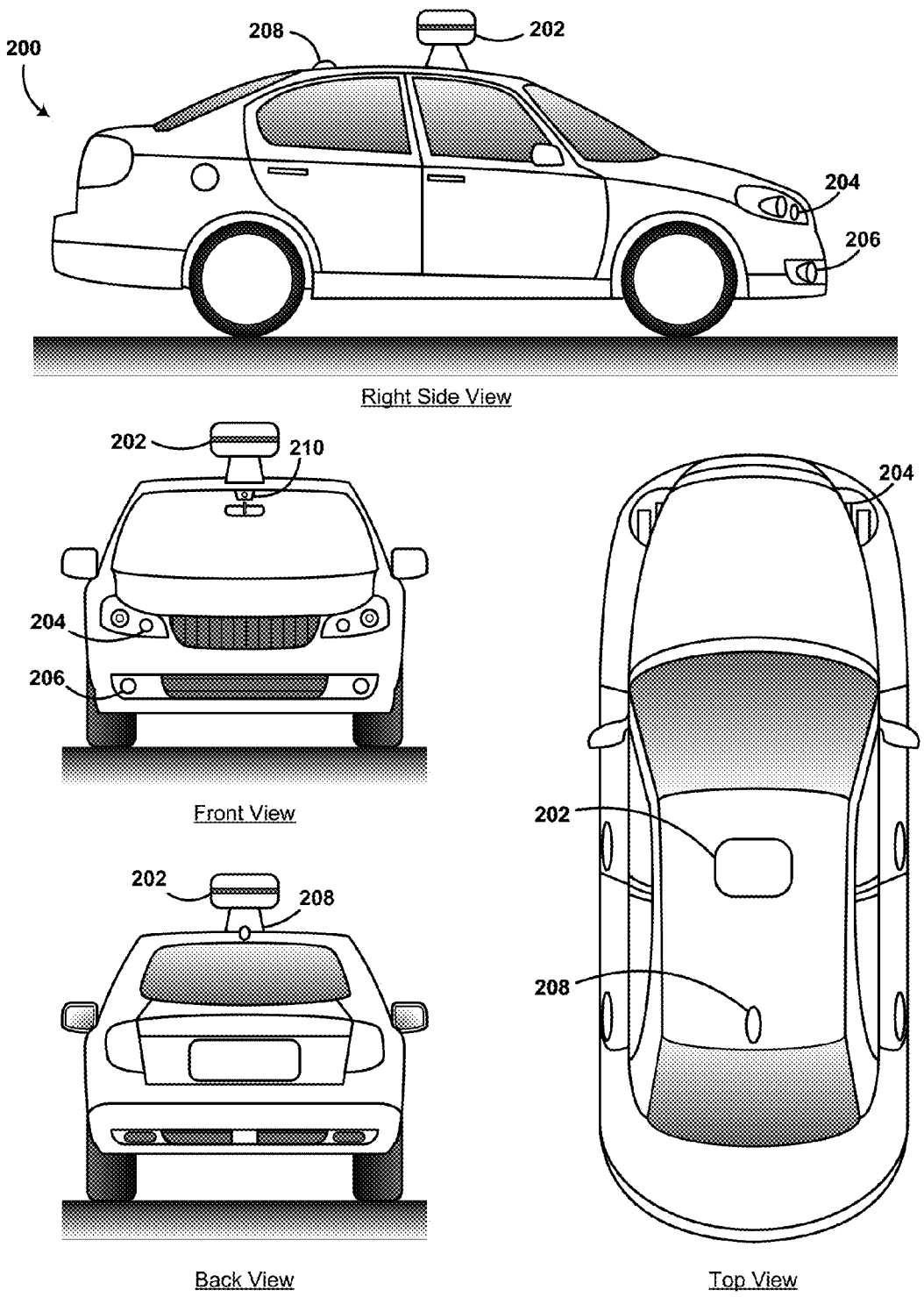
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
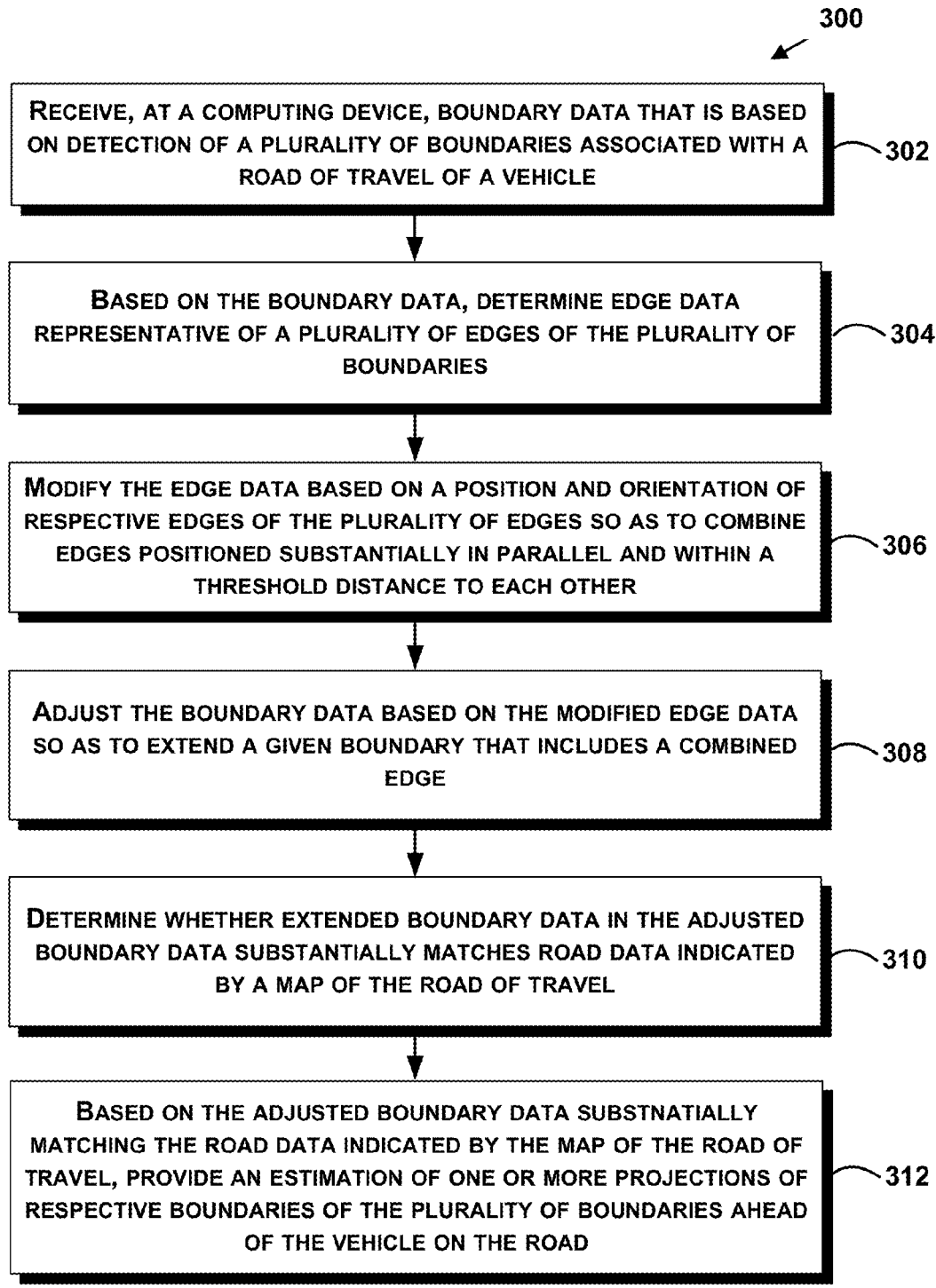
FIG. 3 is a flow chart of an example method for detecting road curbs.

FIG. 3 is a flow chart of an example method 300 for road and lane boundary tracing. The method 300 may include one or more operations, functions, or actions as illustrated by one or more blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be a vehicle, such as the example vehicle 200 illustrated in FIG. 2. Alternatively, the computing device or system that executes some or all of the stored instructions could be another computing device or system, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 may include receiving, at a computing device, boundary data that is based on detection of a plurality of boundaries associated with a road of travel of a vehicle. Within some example implementations, the method 300 may be executed by various types of vehicles. A vehicle executing the method 300 may be equipped with various sensors, which all may be configured to capture data representative of the vehicle's environment. For example, the vehicle may include LIDAR, RADAR, a stereo camera system, and/or other types of sensors configured to obtain environment data, such as data corresponding to objects and surfaces nearby the vehicle. An example vehicle executing processes for road and lane boundary tracing may include other types of sensors or techniques for acquiring information indicative of the environment of the vehicle. In addition, the vehicle may also acquire boundary data and/or road information from a map or another source (e.g., another vehicle), for example. The different sensors may provide the data corresponding to the local environment in a variety of formats, which may include images, point clouds, electric signals, or other formats.

In addition, a vehicle executing the method 300 may also include a computing system (e.g., multiple computing devices), which may assist in operations of the vehicle. The vehicle's computing system may perform various processes for the vehicle, such as control navigation, object detection within data provided by vehicle sensors, and/or maintain a vehicle's positioning on the road. Furthermore, during operation, the computing system of a vehicle may communicate with other devices and components of the vehicle during operation or exterior entities, such as other vehicles or servers.

As indicated previously, the data provided to the computing system by the sensor may exist in various formats (e.g., point clouds) and may include a variety of information for the computing system to process. For example, the data may provide information relating to objects and surfaces in the local environment, which may provide the computing system with indications of poses of objects and/or surfaces relative to the vehicle. In addition, the sensors may provide data that encompasses information relating to the various boundaries detected within the vehicle's local environment by the sensors. The data may include boundary data relating to the particular road that the vehicle is navigating or may contain additional information relating to nearby boundaries, such as road curb information for other roads, etc.

During operation, a vehicle may use boundary data among other data to assist with navigation. For example, a vehicle's computing system may determine control strategies based on the curvature and positioning of a road curb. Similarly, the computing system may constantly monitor the vehicle's positioning within a lane by analyzing the detection of local lane markers as obtained by vehicle sensors. The sensors may capture information of the local environment near the vehicle and provide the information to the vehicle's computing system for processing.

During operation, to keep the computing system aware of the changing environment as the vehicle navigates, the vehicle's sensors may continuously or systematically capture data as the vehicle changes path or orientation relative to the environment. The sensors may provide the different sets of data to the computing system of the vehicle, which may store time or position/location information associated with the received data. For example, the computing system may receive data indicative of the environment (e.g., boundary data) in an incremental order as the vehicle changes position relative to the environment (e.g., driving down a road).

In one example implementation, a vehicle may include a LIDAR module configured to capture point clouds consisting of a number of data points that each may represent a point of a surface or object in the vehicle's local environment. During operation, the LIDAR module may transmit lasers that bounce of nearby objects and/or surfaces. Among the objects and surfaces, lasers may bounce of road boundaries, such as guard rails, road curbs, jersey barriers, sidewalks, lane markers, etc. A sensor or multiple sensors configured with the LIDAR module may capture the laser returns off as the returns bounce off the objects and surfaces to obtain data points indicative of the local environment. The laser returns and data points may enable a computing system to estimate distances between objects as well as distances between the vehicle and objects. In addition, the accumulation of many data points may enable the computing system to estimate structures, positioning, and/or orientation of objects/surfaces in the environment relative to the vehicle.

During operation, a computing system of the vehicle may receive the point clouds from the LIDAR module to use for analyzing the environment. Data points may exist in the point clouds that provide data relating to the boundaries positioned in the environment near the vehicle. The computing system may receive multiple point clouds that the LIDAR module captured at previous time periods and utilize the point clouds for analysis. In particular, the computing system may continuously receive new point clouds representative of the environment based on the changing pose of the vehicle relative to the environment. The computing system may analyze the point clouds as well as other data as the sensors receive and provide the data to the computing system, for example. The vehicle's computing system may be configured to operate in real-time to assess the data instantly as the vehicle may require.

In a further example implementation, the computing system may receive data indicative of the local environment that includes data corresponding to multiple boundaries nearby the vehicle. Boundaries may exist as an indication that the local road may not exist at that position. In some examples, the boundaries may exist as physical structures and the computing system may receive data indicating the position and orientation of the physical boundaries relative to the vehicle. Other examples of boundary data may be acquired and provided by vehicle sensors as well.

In another example implementation, the computing system may receive one or multiple inputs, which may include a grid of data corresponding to detecting locations and/or orientation information for each detected boundary within the local environment of the vehicle. The computing system may receive the inputs from another vehicle, a server, or using vehicle sensors, for example. In addition, within the data, the computing system may receive data providing parameters for detected road curbs, detected boundaries between concrete and grass, k-rail and jersey barrier locations, etc. In some instances, the grid of data may exist as some scalar quantity, which may include edges defined of boundaries within the grid. In addition, the computing system of the vehicle may use computer vision to produce a grid of detected boundary locations based on received data from sensors or another source.

At block 304, the method 300 may include based on the boundary data, determining edge data representative of a plurality of edges of the plurality of boundaries. In particular, a given edge may indicate a discontinuity between a given boundary and a characteristic of the road of travel. For example, edges may represent the discontinuity between the pavement of a road and a road curb, sidewalk, or grass, etc.

Upon receiving data captured by sensors that represents the local environment of the vehicle, a computing system of the vehicle or another entity (e.g., classifier) may be configured to filter or process the data to focus upon boundary information. The computing device may extract boundary data using computer vision techniques, which may involve methods for acquiring, processing, analyzing, and/or understanding data from the environment in order to produce numerical or symbolic information, for example. The computer vision techniques may determine data points that may correspond to boundaries in the local environment. Other processes may be used to identify data that may likely correspond to road or lane boundaries as well.

In some instances, the computing system may analyze the data received from sensors for various reasons, which may include extracting information relating to boundaries. For example, the computing system or another entity associated with the vehicle may determine edges of the boundaries as represented within the data provided by the sensors. Based on the data that likely represents boundaries, the computing system may use different techniques or processes to determine edge data from the acquired data. The processes described herein as merely for example purposes and other processes or techniques may be used by the computing system as well.

In some example implementations of edge data detection, a vehicle's computing system may be configured to perform search-based and/or zero-crossing based edge detection techniques upon the data provided by vehicle sensors or acquired from another source (e.g., map data). The computing system or another entity of the vehicle may perform other processes upon the boundary data as well to extract edge data that represents the edges of the various boundaries detected in the vehicle's local environment.

In the case that the computing system executes a search-based technique, the computing system may detect edges by first computing a measure of edge strength, which may exist as a first-order derivative expression such as the gradient magnitude, and then searching for local directional maxima of the gradient magnitude using a computed estimate of the local orientation of the edge (e.g., gradient direction).

In contrast, in the case that the computing system executes a zero-crossing based method, the computing system may perform the process by searching for zero crossings in a second-order derivative expression computed from the data or image in order to find edges, usually the zero-crossings of the Laplacian or the zero-crossings of a non-linear differential expression. As a pre-processing step to edge detection, the computing system may execute a smoothing stage (e.g., Gaussian smoothing), which may assist in reducing noise that resulted during data acquisition or processing. The computing system may be configured to perform multiple techniques for edge detection, which may include a combination of zero-crossing based methods and/or search-based techniques.

In addition, in another example implementation, a computing system or another entity of the vehicle may execute a Canny edge detection process on the boundary data obtained and provided by sensors. The Canny edge detection and/or other edge tracing techniques may be execute by a computing device and configured to trace edges based on data indicative of the surrounding environment, which may encompass boundary data in some instances. A Canny edge detection process may involve a multi-stage algorithm to detect a wide range of edges within data provided by sensors. In order to execute good detection, the computing system may use Canny edge detection to mark or detect as many real edges in the data provided by sensors as possible. In addition, Canny edge detection may assist in attempting to acquire good localization by attempting to mark respective edges as close as possible to the edges in the data provided by the sensors, for example. Further, the computing system may also utilize a Canny edge detection process to aim for a minimal response, which may involve the detection process marking a given edge in data provided data only once to prevent repeats. Similarly, this may correspondingly help prevent image noise causing create false edges. In some instances, the computing system may also use Canny edge detection to apply a filter based on a Gaussian (e.g., bell curve) to filter noise. The computing system may be configured to store the edge data in memory or format the edge data, for example.

In an example implementation of using Canny edge detection, a computing system of the vehicle may identify locations as represented by a data-grid that may likely correspond to a boundary over other locations. The computing system may analyze the data-grid at a local level or a higher level in other implementations. In the case that the input probability of the data-grid location representing a boundary may exist as high, then the computing system may label the location in the data-grid as representative of a boundary. In the case that the probability is low, the computing system may label that particular location as not indicative of a boundary. In the situations that the probability is in the middle ground of a location in the data-grid or the data in general may represent a boundary, the computing system may use other information to determine whether or not the locations may represent boundaries. Other information may include examining neighbor locations and determining whether those locations represent boundaries.

The computing system may extract edges that represent edges of various types of boundaries associated with roads near the vehicle. For example, the computing system may extract edge data that corresponds to edges of road curbs, detected boundaries between concrete and grass, k-rails, jersey barriers, and other types of boundaries. The edge data may provide various parameters to the computing system, such as position and orientation information relating to the boundaries. Likewise, the computing system may determine location of boundaries according to the edge data and may also be able to determine breaks in boundaries and changes in orientation of the boundaries. In some instances, the computing system may process a data grid of information received for edge data corresponding to boundaries in the local environment of the vehicle.

Furthermore, in some example implementations, the computing system may receive boundary data in the form of a data grid that includes data indicative of boundaries in the local environment as well as position data corresponding to one or more other vehicles. The computing system may receive information relating to the position of parked vehicles or other vehicles traveling nearby, which may affect the acquisition of boundary data. For example, parked vehicles may affect LIDAR receiving information relating to a road curb. The computing system may factor in the positioning data with the boundary data in some instances. In addition, the data-grid may also provide the computing system of the vehicle with images depicting lane markers or other boundaries as well as possible road geometry data. The road geometry data may include data relating to the positioning, orientation, size, or other characteristics of roads in the local environment, for example. The orientation data may be derived from underlying three-dimensional data, which may have be received during a previous detection, such as the initial detection of objects in the vehicle's surrounding environment.

At block 306, the method 300 may include modifying the edge data based on a position and orientation of respective edges of the plurality of edges so as to combine edges positioned substantially in parallel and within a threshold distance to each other. After determining edge data that includes position and orientation information of the edges of boundaries in the local environment (which may be relative to the vehicle), the computing system may modify the edge data for analysis and processing. The modifications may improve the accuracy of the edge data or may also reduce data indicative of noise, for example. In some cases, the computing system may modify the edge data based on position and orientation of respective edges of the detected edges, which may involve identifying edges in the edge data that may benefit from some form of adjustment by the computing system.

In one example implementing involving executing modification upon a set or subset of edge data, a computing system of the vehicle or another entity may determine that multiple edges are within a threshold distance from each other and positioned substantially in parallel. In particular, the computing system may modify the edge data so as to combine the multiple edges so that only a single edge may be represented. In such an example modification, the modifications executed by the computing system may alter the edge data to limit repeats of unnecessary edges (e.g., multiple edges positioned closely in parallel), which may have been captured as a result of data-acquisition noise during the operating of vehicle sensors.

Likewise, the computing system may want the edge data to represent a single edge at that point rather than multiple edges. For example, the computing system may configure edge data of a road curb to show the road curb as a single edge, rather than multiple edges. The computing system may modify the edge data to remove edges, segments of edges, increase edges, manipulate the position, curvature, or orientation of edges, for example.

In the example modification of edge data discussed, the computing system may modify edge data representing edges based on flexible degrees of accuracy. For example, the vehicle's computing system may modify edge data representing edges positioned substantially in parallel. In some instances, the computing system may vary on the degree the edges may need to be positioned in parallel. The computing system may modify the edge data based on edges positioned closely in parallel, or may position edges loosely positioned in parallel. The computing system may vary when selecting edges for modification, and may include a buffer for determining accuracy or positioning.

Likewise, the computing system may have varying requirements for the threshold distance requirement between edges within edge data. The computing system may extend the threshold distance in some instances as well.

In another example implementation, a vehicle's computing system may analyze each detected edge, which may involve starting from a first point of an edge and then the other endpoint, nearby untraced boundary locations or traced edges may also be checked. For example, the computing system may determine that the gap between two edges within edge data may be small enough in size (e.g., below an gap-size threshold) to modify the edge data to represent the two edges as a single edge. In some instances, the computing system may determine that the gradients of the edges are reasonably aligned and configure the edge data to connect the multiple edges. Furthermore, the computing system may determine if a traced edge connects to a single untraced detection within a set distance (e.g., a threshold distance) and with similar gradients, the edge may be grown into that cell and the process may be repeated by the computing system. The computing system may link missing gaps of edges within edge data using other techniques as well.

At block 308, the method 300 may include adjusting the boundary data based on the modified edge data so as to extend a given boundary that includes a combined edge. After modifying the edge data, if necessary, the computing system may be configured to adjust the boundary data that may have been originally provided by vehicle sensors. The computing system may adjust the boundary data to reflect the modifications made on the edge data. For example, the computing system may adjust the boundary data so as to extend a boundary that contains modified edges.

The computing system may adjust the boundary data to represent boundaries as indicated by the modified edges. For example, the computing system may adjust the boundary data to extend a boundary that may result from combining the substantially parallel multiple edges in the edge data. Similarly, the computing system may extend boundaries in the boundary data based on the computing system filling in gaps in edges in the edge data.

Furthermore, the computing system may reposition or change the orientation of boundaries based on the edge detection and modification of edge data. For example, the computing system may alter boundary data to represent boundaries that match the modified edges, which may include adding boundaries, shortening or lengthening boundaries, or other changes to the data.

In some instances, the computing system may adjust the boundary data to remove boundaries. The computing system may remove boundaries within the data in the case that the computing system determined the boundary may have resulted from data-acquisition noise, for example. The computing system may apply a smoothness check, which may involve determining that boundaries, as indicated by boundary data, include a connected structure that does not suddenly change orientation or position in a manner unlike most boundaries. Furthermore, the computing system may also fill in portions of boundaries that may have been undetected due to obstacles in the way, such as parked vehicles or road signs. The computing system may adjust the boundary data to reflect any data acquired about the local environment of the vehicle that may indicate the boundary data may need adjustments.

In some cases, the computing system may use other data acquired by sensors (e.g., images) to assist with adjusting boundary data. For example, the computing system of the vehicle may use images to determine that a boundary, such as a guard rail, may not include any gaps and may require the computing system to adjust the boundary data to represent the boundary without the gaps. Similarly, the computing system may also adjust boundary data to connect closely positioned, aligned boundaries that display like characteristics (e.g., both metal and same height and orientation).

At block 310, the method 300 may include determining whether extended boundary data in the adjusted boundary data substantially matches road data indicated by a map of the road of travel. In particular, the computing system may analyze the boundary data to determine if the data represents boundaries that display smooth structures that likely correspond to physical boundaries in the environment of the vehicle. A map may provide information relating to positions and orientations of roads, boundaries, obstacles, or other types of information. In some instances, the computing system may use a GPS system to determine a vehicle's location or position relative to a map. The comparison may enable the computing system to follow the road or other data represented by the map in accordance with the location of the vehicle. In addition, in an example implementation, the computing system may vary on the accuracy of the boundary data compared to the map data. The computing system may change the threshold required for the boundaries in the boundary data to substantially match the information provided by a map. The computing system may also use information images or road geometry to assist with determining whether extended boundary data in the adjusted boundary data partially or accurately matches the map.

During operation, the computing system may compare the position and orientation of boundaries as represented in boundary data to determine if the boundaries may have proper positioning as compared to a map of the environment. The computing system may use a map or multiple maps received from a server or may use maps generated by sensors of the vehicle. In some instances, the computing system may acquire maps from other vehicles as well.

In some instances, the computing system may modify the adjusted boundary data based on a map or multiple maps of the local environment of the vehicle. For example, the computing system may update the boundary data to represent boundaries with positions and orientations that fit the roads within the map. The computing system may use a map to determine a position or orientation for boundaries in general. The computing system may fit the boundaries within boundary data to barriers or the road indicated by the map. The computing system may also use other data in addition to map data to adjust boundary data.

Furthermore, a computing system or another entity associated with the vehicle may determine that the boundary data contains data representing boundaries that are not sufficiently smooth. In such a case, the computing system may update the boundary data to process the unsmooth boundaries data. For example, the computing system may alter the boundary data to separate the uneven boundaries into multiple boundaries or may remove portions or sections from the unsmooth boundaries. Likewise, the computing system may also eliminate boundaries that display unsmooth characteristics from the boundary data. Other examples may exist as well.

At block 312, the method 300 may include based on the adjusted boundary data substantially matching the road data indicated by the map of the road of travel, providing an estimation of one or more projections of respective boundaries of the plurality of boundaries ahead of the vehicle on the road. A computing system of the vehicle or another entity may process the adjusted boundary data and determine that the boundary data is accurate. In response, the computing system may estimate projections of certain boundaries, such as road curbs or lane markers, ahead of the vehicle on the road. The projections may enable the computing system to determine and implement control strategies for navigation that account for longer spans of time or cover more ground, for example.

In some instances, the computing system may alter the path of travel of the vehicle based on the detection and estimation of boundaries ahead of the vehicle's navigation. For example, the computing device may determine that a road curb may display a curvature and require the vehicle to execute a turn down the road from the current position of the vehicle. Similarly, the vehicle may use the estimations of boundaries to assist in staying within a lane on the road. In some instances, the computing system may adjust boundary data prior to estimating projections of the data. The computing system may adjust the boundary data based on the map or other information acquired by sensors (e.g., images).

In one example implementation, a computing system of the vehicle may determine that detected road curbs or other boundaries may complement each other. The computing system may analyze the alignment and/or orientation of estimated and/or detected road curbs as represented in data to ensure proper positioning. The computing system may reprocess or reject data corresponding to road curbs or other barriers that may curve or change orientation too quickly, which may indicate that the data may be inaccurate.

In another example implementation, a computing system of a vehicle may estimate or hallucinate boundaries that may have been previously traced or analyzed. Hallucinating boundaries forward may involve the computing system of the vehicle continuing the orientation of the boundaries from their endpoints. In particular, the computing system may hallucinate or estimate projections of boundaries ahead of the vehicle as long as some form of evidence exists that a boundary may likely exist at that position and location in the environment. In some instances, the computing system may estimate projections of boundaries even in cases that orientations may not match in the projected positions. The computing system may estimate projections of boundaries based on a size, position, and orientation of the respective boundaries, for example.

Furthermore, in some examples, the vehicle's computing system may require boundary sections extend a predefined distance (e.g., 20 meters long) prior to estimating projections of the particular boundary sections ahead of the vehicle. In such an example, the computing system may ensure that the boundary may exist. The computing system may analyze endpoints to determine if the boundaries display elements that may indicate that the boundary may continue ahead of the vehicle. The computing system may factor the orientation and position of boundaries prior to estimating projections as well.

In some instances, the computing system may estimate projections of boundaries ahead of the vehicle based on the analog nature of boundary detection. The computing system of the vehicle may process the boundary data despite system noise that may affect objection detection. The computing system may be configured to continue tracing through reasonably sized segments of a boundary that may be missing or indicative of noise.

In an example implementation, a computing system may use the method 300 or the results from executing the method for offline use, which may involve extracting lane and road boundaries from offline built maps. The computing system may send the boundary information to other entities, such as servers, vehicles, or classification systems.

In yet another example implementation, the computing system of a vehicle may execute processes relating to a smoothness check upon the boundary data and/or edge data. The computing system may determine that a section or segment of a boundary as represented by boundary data may not be smooth. The computing system may remove the section or reconfigure the boundary data. The computing system may execute the smoothness check process in an iterative manner, which may involve constantly analyzing the boundary data or analyzing the data in a certain predefined order. The computing system may use threshold determinations to filter boundary data to reflect boundaries that may actually exist in the vehicle's local environment. The computing system may break boundaries up by modifying boundary data if the boundaries display quick changes in position and orientation that may signal a lack of smoothness sometimes associated with a boundary. For example, a guard rail positioned on the side of a road, such as a highway, may not likely include segments of sharp changes in orientation and position. The computing system may use that information to identify boundaries within boundary data that may have been captured as a result of system noise since the boundaries display characteristics involving sharp changes in position and orientation that likely do not correspond to the smoothness of a straight or slightly curving highway or road.

The computing system of the vehicle may execute the process and may provide an output that may be used for local detection during another execution of the process. The computing system may use the process for general objection detection. For example, the computing system may use the objection detection process to identify changes in pavement (e.g., points where pavement and grass may meet). Similarly, the computing system may use the process to detect lane marker boundaries, such as lane markers on the road marking different lanes. For example, the computing system may connect the segments of dash lines that may show lane separation on a road. The computing system may execute the process in real-time or as part of a mapping process, for example.

Moreover, the computing system may distribute the boundary detection information to other components of the vehicle for use. In some instances, the computing system may exist separate from the vehicle and may be configured to execute boundary detection from a remote point, for example.

In another example implementation, a computing system of a vehicle may detect a road curb, which may exist as the structure that separates the road and nearby grass. In some instances, the grass may appear as another road curb, which the computing system may detect using edge analysis techniques. For example, the computing system may determine based on the position and orientation of the road curb and grass that the computing system should combine the edges so as to appear as a single edge. The computing system may also be configured to focus upon the inside edge, which may correspond to the physical road curb rather than the grass. Further, the computing system may also perform global processing to link up segments of boundaries within the example implementation, for example. The computing system may take detected boundary segments that may meet a minimum size requirement, and may analyze a larger window for other larger segments of boundaries consistent with orientation of first boundary. In some instances, the computing system may also be configured to process boundary data so that respective boundaries correspond to changes applied to edges in the modified edge data, which may occur prior to estimating projections of boundaries, for example.

In a further example implementation, a computing system of a vehicle may provide the estimation of projections of respective boundaries ahead of the vehicle on the road to a classification system, which may determine the types of boundaries represented by the projections. In addition, the classification system may process the estimation of projections of boundaries to identify projections that may not correspond to actual boundaries in the environment of the vehicle. The classification system may execute other tasks as well using the projections or boundary data provided by the computing system of the vehicle. The estimated projections may also be based on the position and orientation of the road. For example, the projections may curve along with the curvature of the road. The computing system may control the vehicle based on outputs of the classification system.

Figure 4:
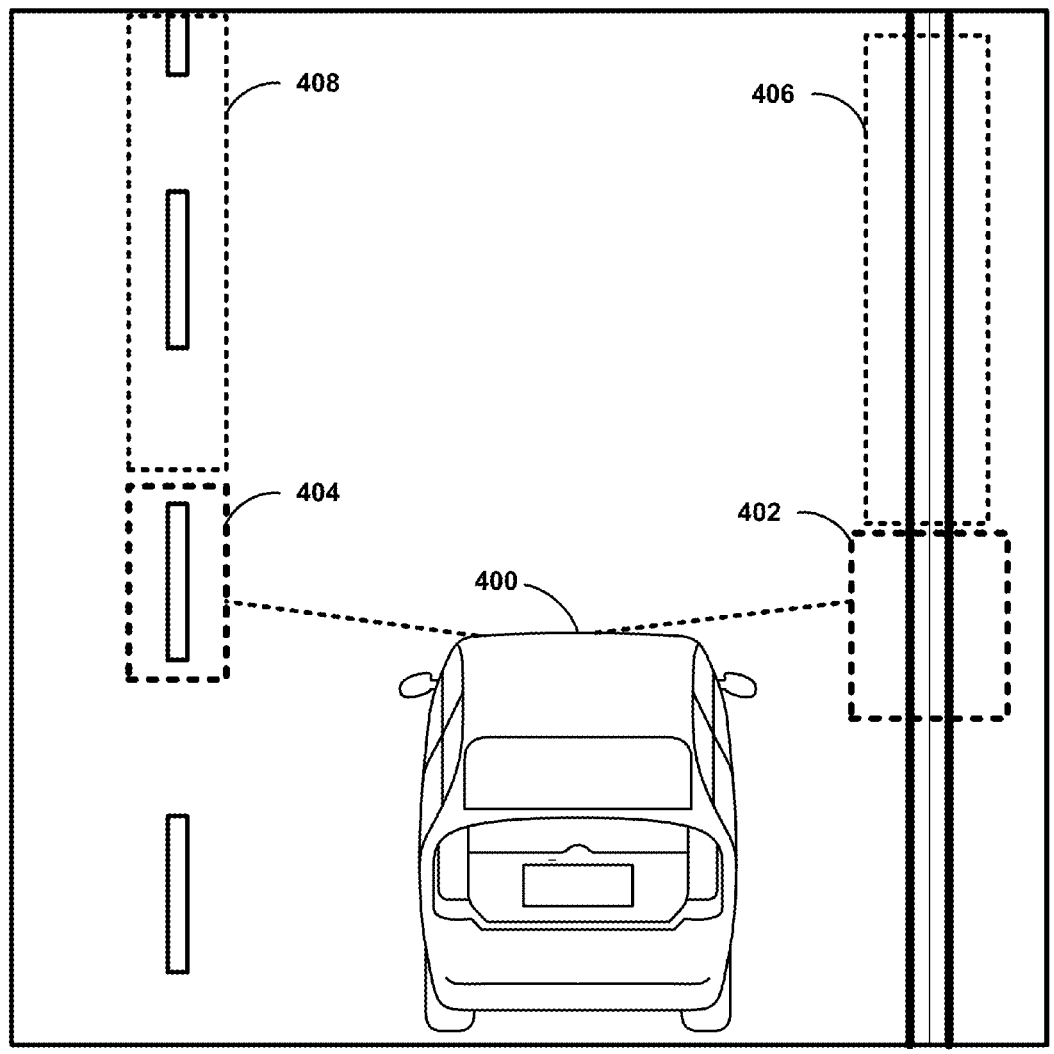
FIG. 4 is a conceptual illustration of an example vehicle performing road and lane boundary tracing.

FIG. 4 is a conceptual illustration of an example vehicle performing road and lane boundary tracing. In the conceptual illustration, an example vehicle 400 may receive data representative of the local environment of the vehicle 400 from vehicle sensors. A computing system of the vehicle 400 may use the data to detect boundary data that represents boundaries in the local environment of the vehicle 400. In the example shown in FIG. 4, the computing system may detect boundary data indicative of the nearby road curb segment 402 and lane marker 404. The computing system may process the boundary data in order to estimate projections of the boundaries ahead of the vehicle 400 on the road. For example, the conceptual illustration in FIG. 4 shows estimated projections of the road curb segment 402 and lane marker 404 represented by projections 406-408. The projections of the lane markers, road curbs, and other boundaries may not appear in the actual environment of the vehicle, but may represent the estimations made by the computing system based on received boundary data. The projections 406-408 shown in FIG. 4 serve for illustration purposes.

In one example implementation, the vehicle 400 may receive data about the surrounding environment using LIDAR, which may capture data including boundary data in the form of point clouds. In addition, the computing system may receive data from other sensors (e.g., images from a camera system). The computing system may use the data to determine position and orientation information of nearby boundaries and/or other objects in the local environment relative to the vehicle 400. As shown in FIG. 4, the computing system may receive data representative of the road curb segment 402 and the lane marker 404 positioned nearby the vehicle 400.

In order to navigate autonomously and avoid obstacles, the computing system of the vehicle 400 may process received data in order to estimate projections 406-408 of the road curb segment 402 and lane marker 404 that extend with the road that may be used to determine control strategies for the vehicle 400. Processing the received data may involve the computing system identifying edges of boundaries within the data. For example, the computing system may detect edge data of boundaries using point clouds captured by LIDAR of the vehicle's local environment. The computing system may apply various techniques to extract edge data, such as Canny edge detection. For example, the computing system may use Canny edge detection to determine the edges of nearby lane markers (e.g., lane marker 404) and road curbs (e.g., road curb segment 402).

In addition, after extracting edge data, the computing system of vehicle 400 may modify the edge data to improve the efficiency and accuracy of the detection. For example, the computing system may any edge data that represents edges positioned substantially in parallel and within a threshold distance to each other in order to modify the edge data to represent the edges as a single, combined edge. The computing system may eliminate unnecessary duplicates by combining or selecting edges positioned in parallel that may indicate inaccuracy. For example, the computing system may detect an edge corresponding to a road curb and another edge closely positioned in parallel corresponding to grass on the side of the road curb. In such an example, the computing system may likely only want to utilize the edge representing the road curb. Therefore, the computing system may combine the edges so that the single edge represented in edge data corresponds only to the road curb and not to the grass. Within examples, the computing system may operate with some flexibility when determining whether edges or portions of edges are positioned substantially in parallel. For example, the computing system may modify edge data to combine edges that are positioned nearly in parallel and close together or may allow roughly parallel edges to be processed together as well. In addition, the threshold distance requirement between multiple edges as represented in edge data may vary within examples.

Furthermore, the computing system may also modify the edge data in other ways, such as extending edges or removing segments or complete edges as well. For example, the computing system may processes edges to identify gaps that may have occurred as a result of noise or obstruction by an obstacle. In one such case, the computing system may fill in edges that appear to include gaps evident of noise or obstruction (e.g., parked vehicles blocking the sensors slightly).

Based on the modifications made to the edge data, the computing system may also adjust or update the boundary data. For example, the computing system may adjust its boundary data to correspond to combined edges or edges that have been removed or extended. The computing system may alter the boundary data corresponding to lane markers (e.g., lane marker 404) and/or road curbs (e.g., road curb segment 402), for example.

In some instances, the computing system may also use map data from a map generated by vehicle sensors or received from a server to analyze the accuracy of the boundaries according to the boundary data. The computing system may use the map information to fit boundaries in the proper location and/or orientation according to the map. Likewise, the computing system may also check boundary data to determine whether boundaries represented by the data exhibit smooth structures likely corresponding to boundaries rather than segments with varying orientations, positions, and lack of connectivity.

Furthermore, the computing system of the vehicle 400 may also use the boundary data, which may have been adjusted using modified edge data, to estimate projections of boundaries ahead of the vehicle 400 in correspondence with the road. For example, the computing system may estimate projection 406 based on detection of the road curb segment 402. Similarly, the computing system may estimate the projection 408 of lane markers ahead on the road based on detecting lane marker 404. The computing system may use detected boundaries or estimated projections to assist with other projections of boundaries. For example, the computing system may use the road curb segment 402 and projection 406 to determine that the road extends in a straight path without a curve in the extended distance. Based on determining that the road extends in a straight path, the computing system may project that the lane markers may likely extend in a straight path as well, as shown by projection 408. Likewise, the computing system may use the lane markers and/or projection of lane markers to determine that the road curb may likely extend in a straight path similar to the lane markers.

In some implementations, the computing system of the vehicle 400 may execute a smoothness check or overall analysis based on the estimated projections of boundaries as well. For example, the computing system may require additional sensor information in response to determining that estimated boundaries do not agree or align properly (e.g., projections providing conflicted information about the road ahead). The computing system may use the map or smoothness check as well to help filter estimated projections, which may involve identifying projections that may likely not correspond to boundaries in the local environment of the vehicle.

Figure 5:
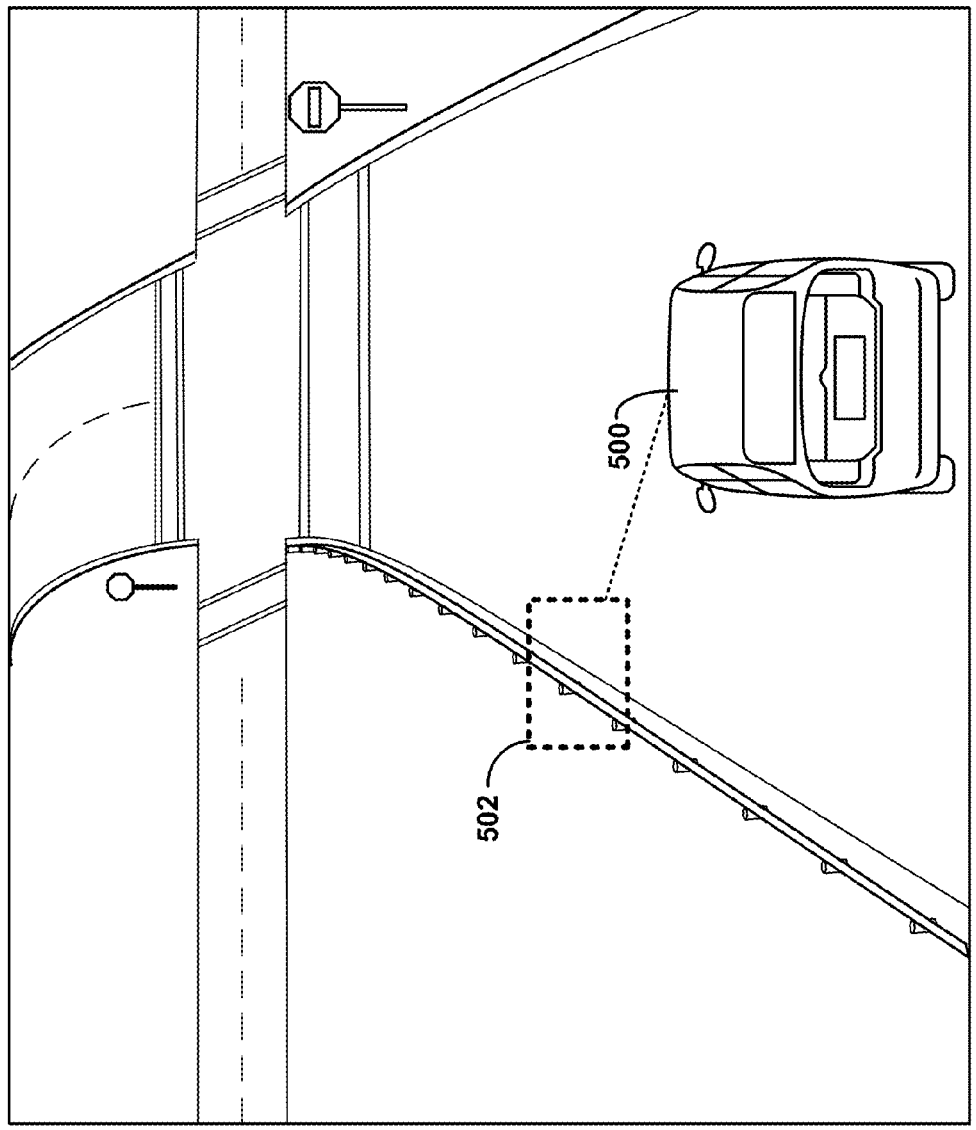
FIG. 5 is another conceptual illustration of an example vehicle performing road and lane boundary tracing.

FIG. 5 is another conceptual illustration of an example vehicle performing road and lane boundary tracing. In particular, the conceptual illustration shows the example vehicle 500 detecting a nearby road boundary (i.e., guard rail), which the computing system of the vehicle 500 may use to estimate a projection of the guard rail ahead of the vehicle 500 on the road.

In the illustration, similar to the example shown in FIG. 4, the vehicle 500 may capture data of the local environment, which may involve using LIDAR, RADAR, cameras, or other types of sensors. For example, the computing system may receive a point cloud of data representative of the nearby guard rail segment 502. Upon detecting the guard rail segment 502 within data representative of the vehicle's local environment, a computing system of the vehicle may perform a boundary detection process, such as executing the example method 300 previously discussed.

In one example implementation, the vehicle 500 may receive boundary data that may based on detection of a plurality of boundaries associated with the road. For example, the computing system of vehicle 500 may receive data that includes boundary data representing the nearby guard rail 502 and/or lane markers, for example.

Based on the boundary data, the computing system may further determine edge data representative of edges of the detected boundaries. In some instances, each edge may indicate a discontinuity between a given boundary (e.g., guard rail) and a characteristic of the road of travel, such as pavement or a level plane indicative of the road. Edges may be used by the computing system to identify possible data corresponding to noise or other inaccurate flaws within data that may require removal or further processing, for example. In some instances, the computing system may modify the edge data based on position and orientation of respective edges of the detected edges. For example, the computing system may modify the edges so as to combine edges positioned substantially in parallel and within a threshold distance to each other. The computing system may execute the modifications of the edge data for the edges of the guard rail segment 502, for example. Similarly, the computing system may extend edges to connect closely positioned and aligned edges. The gap within closely positioned edges may have resulted from an obstruction by an obstacle or data acquisition noise, for example. In some instances, the computing system may factor other data to assist with modifying edges. For example, the computing system may use images from cameras to determine whether an edge of a boundary exists as particular location or whether a boundary includes a gap or changes position/orientation.

In addition, the computing system of the vehicle 500 may adjust any stored boundary data based on the modified edge data so as to extend a given boundary that includes a combined edge. The computing system may adjust the boundary data in other ways as well. In some instances, the computing system of the vehicle 500 may determine whether extended boundary data in the adjusted boundary data substantially matches road data indicated by a map of the road of travel. The computing system may use a confidence level associated with determining whether boundary data matches map data. In some instances, the computing system may require the match meet a threshold prior to estimating projections of boundaries. The vehicle 500 may acquire the map from a server, another vehicle, or may generate the map using sensor data, for example.

Furthermore, the computing system of the vehicle 500 may execute and provide, based on the adjusted boundary data substantially matching the road data indicated by the map of the road of travel, an estimation of one or more projections of respective boundaries of the plurality of boundaries ahead of the vehicle on the road. For example, the computing system may estimate projections of boundaries, such as the guard rail of the guard rail segment 502, ahead of the vehicle 500 on the road of travel. The computing system may also estimate projections of lane markers, road curbs, or other objects, for example. The computing system of the vehicle 500 may use the estimated projections when determining control strategies for navigating the vehicle 500. For example, the computing system may follow the guard rail to assist in finding an exit or maintaining lane position. Likewise, the computing system may use estimated projections to determine when to turn or maintain a navigational path, which may include changing speeds or directions of the vehicle 500. For example, in the conceptual illustration shown in FIG. 4, the computing system of the vehicle 500 may determine an intersection may be approaching based on using estimated projections of nearby boundaries. The computing system may continuously update the estimated projections to monitor the road ahead of the vehicle as well as nearby. Other examples of using boundary data to assist with navigation may exist as well.

Figure 6:
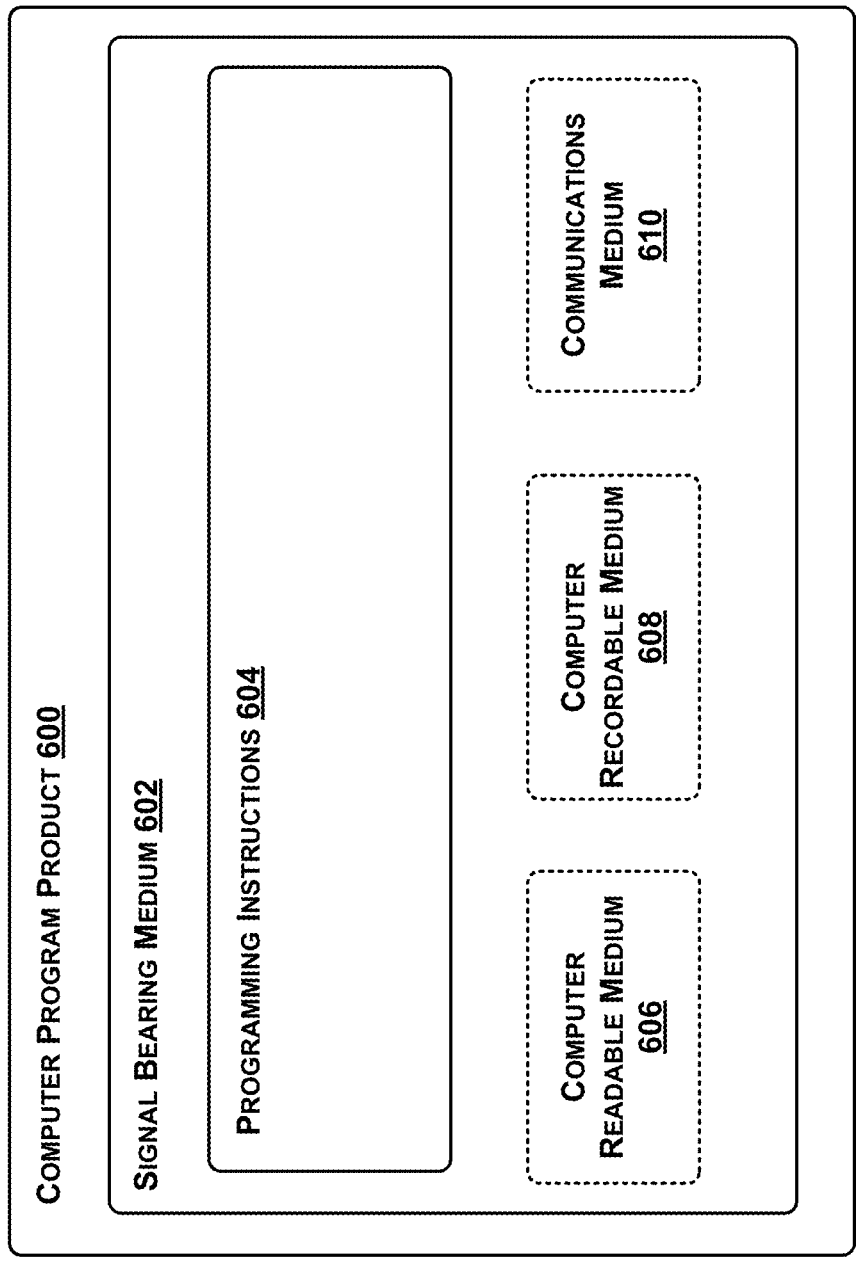
FIG. 6 is a schematic illustrating a conceptual partial view of an example computer program product that includes a computer program for executing a computer process on a computing device.

FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-3 and FIGS. 4A-4D. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the processor 112 of FIG. 1 may be configured to provide various operations, functions, or actions in response to the programming instructions 604 conveyed to the processor by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

The invention claimed is:

1. A method comprising:
receiving, at a computing device of a vehicle from one or more sensors of the vehicle, boundary data that is based on detection of a plurality of boundaries associated with a road of travel of the vehicle;
based on the boundary data, determining edge data representative of a plurality of edges of the plurality of boundaries, wherein a given edge indicates a discontinuity between a given boundary and a characteristic of the road of travel;
modifying the edge data based on a position and orientation of respective edges of the plurality of edges so as to combine edges positioned substantially in parallel and within a threshold distance to each other;
adjusting the boundary data based on the modified edge data so as to combine respective boundaries having combined edges positioned substantially in series and within a threshold distance to each other;
determining whether the combined respective boundaries in the adjusted boundary data substantially match road data indicated by a map of the road of travel;
based on the adjusted boundary data substantially matching the road data indicated by the map of the road of travel, providing an estimation of one or more projections of the combined respective boundaries of the plurality of boundaries ahead of the vehicle on the road; and
controlling, at the computing device of the vehicle, one or more systems of the vehicle based at least in part on the estimation of one or more projections of the combined respective boundaries of the plurality of boundaries ahead of the vehicle on the road.

2. The method of claim 1, wherein modifying the edge data based on a position and orientation of respective edges of the plurality of edges so as to combine edges positioned substantially in parallel and within a threshold distance to each other further comprises:
modifying the edge data so as to connect respective edges with given ends positioned substantially together.

3. The method of claim 1, wherein the boundary data indicates a position and orientation of respective boundaries relative to the vehicle.

4. The method of claim 1, wherein the plurality of boundaries associated with the road of travel of the vehicle comprise one or more of detected road curbs, detected boundaries between a road surface and grass, one or more k-rails, or one or more jersey barriers.

5. The method of claim 1, wherein determining edge data representative of a plurality of edges of the plurality of boundaries comprises performing a Canny Edge Detection.

6. The method of claim 1, further comprising:
providing instructions to control the vehicle based on the estimation of one or more projections of the combined respective boundaries of the plurality of boundaries ahead of the vehicle on the road.

7. The method of claim 1, wherein receiving, at a computing device, boundary data that is based on detection of a plurality of boundaries associated with a road of travel of a vehicle comprises:
receiving boundary data from one or more of a LIDAR module, a RADAR module, and a camera system.

8. The method of claim 1, wherein based on the adjusted boundary data substantially matching the road data indicated by the map of the road of travel, providing an estimation of one or more projections of the combined respective boundaries of the plurality of boundaries ahead of the vehicle on the road is further based at least in part on a size of the combined respective boundaries.

9. The method of claim 1, further comprising:
generating a map of a road of travel using data provided by one or more sensors associated with the vehicle; and
wherein determining whether the combined respective boundaries in the adjusted boundary data substantially match road data indicated by a map of the road of travel is based on the generated map of the road of travel.

10. The method of claim 1, wherein determining whether the combined respective boundaries in the adjusted boundary data substantially match road data indicated by a map of the road of travel comprises:
modifying the adjusted boundary data based on the map of the road of travel, wherein modifying the adjusted boundary data includes updating a position and orientation of a respective boundary in the adjusted boundary data to fit the map of the road of travel.

11. A system comprising:
at least one processor of a vehicle; and
a memory having stored thereon instructions that, upon execution by the at least one processor, cause the system to perform functions comprising:
receiving, from one or more sensors of the vehicle, boundary data that is based on detection of a plurality of boundaries associated with a road of travel of the vehicle;
based on the boundary data, determining edge data representative of a plurality of edges of the plurality of boundaries, wherein a given edge indicates a discontinuity between a given boundary and a characteristic of the road of travel;
modifying the edge data based on a position and orientation of respective edges of the plurality of edges so as to combine edges positioned substantially in parallel and within a threshold distance to each other;
adjusting the boundary data based on the modified edge data so as to combine respective boundaries having combined edges positioned substantially in series and within a threshold distance to each other;
determining whether the combined respective boundaries in the adjusted boundary data substantially match road data indicated by a map of the road of travel;
based on the adjusted boundary data substantially matching the road data indicated by the map of the road of travel, providing an estimation of one or more projections of the combined respective boundaries of the plurality of boundaries ahead of the vehicle on the road; and
controlling one or more systems of the vehicle based at least in part on the estimation of one or more projections of the combined respective boundaries of the plurality of boundaries ahead of the vehicle on the road.

12. The system of claim 11, wherein the function of providing an estimation of one or more projections of the combined respective boundaries of the plurality of boundaries ahead of the vehicle on the road is further based given lengths of the combined respective boundaries exceeding a predefined threshold length.

13. The system of claim 11, wherein the function of providing an estimation of one or more projections of the combined respective boundaries of the plurality of boundaries ahead of the vehicle on the road includes providing the estimation of the one or more projections of the combined respective boundaries to a classification system configured to process the estimation of the one or more projections of the combined respective boundaries to determine an output indicative of given projections of the one or more projections of the combined respective boundaries that correspond to actual boundaries in an environment of the vehicle.

14. The system of claim 13, further comprising:
based on the output of the classification system, providing instructions to control the vehicle.

15. The system of claim 11, further comprising:
receiving one or more images depicting lane markers and road geometry data; and
wherein the function of determining whether the combined respective boundaries in the adjusted boundary data substantially match road data indicated by a map of the road of travel is further based on the one or more images depicting lane markers and road geometry data.

16. The system of claim 11, wherein the function of providing an estimation of one or more projections of the combined respective boundaries of the plurality of boundaries ahead of the vehicle on the road is also based on one or more of a size, position, and orientation of the respective boundaries of the plurality of boundaries.

17. A non-transitory computer readable medium having stored thereon instructions that, upon execution by a computing device of a vehicle, cause the computing device to perform functions comprising:
receiving, from one or more sensors of the vehicle, boundary data that is based on detection of a plurality of boundaries associated with a road of travel of the vehicle;
based on the boundary data, determining edge data representative of a plurality of edges of the plurality of boundaries, wherein a given edge indicates a discontinuity between a given boundary and a characteristic of the road of travel;
modifying the edge data based on a position and orientation of respective edges of the plurality of edges so as to combine edges positioned substantially in parallel and within a threshold distance to each other;
adjusting the boundary data based on the modified edge data so as to combine respective boundaries having combined edges positioned substantially in series and within a threshold distance to each other;
determining whether the combined respective boundaries in the adjusted boundary data substantially match road data indicated by a map of the road of travel;

based on the adjusted boundary data substantially matching the road data indicated by the map of the road of travel, providing an estimation of one or more projections of the combined respective boundaries of the plurality of boundaries ahead of the vehicle on the road; and controlling one or more systems of the vehicle based at least in part on the estimation of one or more projections of the combined respective boundaries of the plurality of boundaries ahead of the vehicle on the road.

18. The non-transitory computer readable medium of claim 17, wherein the function of providing an estimation of one or more projections of the combined respective boundaries of the plurality of boundaries ahead of the vehicle on the road is further based on a position and orientation of the road.

19. The non-transitory computer readable medium of claim 17, wherein the function of providing an estimation of one or more projections of the combined respective boundaries of the plurality of boundaries ahead of the vehicle on the road includes providing the estimation of the one or more projections of the combined respective boundaries to a classification system configured to determine respective types of boundary of the combined respective boundaries.

20. The non-transitory computer readable medium of claim 19, wherein the classification system is further configured to process the estimation of the one or more projections of the combined respective boundaries to represent projections of respective boundaries that correspond to actual boundaries in an environment of the vehicle.

\* \* \* \* \*